(12) United States Patent
Sendrovitz

(10) Patent No.: US 6,946,873 B1
(45) Date of Patent: Sep. 20, 2005

(54) METHOD AND SYSTEM FOR RECOVERING AND ALIGNING SYNCHRONOUS DATA OF MULTIPLE PHASE-MISALIGNED GROUPS OF BITS INTO A SINGLE SYNCHRONOUS WIDE BUS

(75) Inventor: Ran Sendrovitz, San Ramon, CA (US)

(73) Assignee: Network Equipment Technologies, Inc., Fremont, CA (US)

( * ) Notice: Subject to any disclaimer, the term of this patent is extended or adjusted under 35 U.S.C. 154(b) by 0 days.

(21) Appl. No.: 10/810,336

(22) Filed: Mar. 26, 2004

(51) Int. Cl.[7] .......................................... H03K 19/177
(52) U.S. Cl. .............................. 326/41; 326/38; 326/37
(58) Field of Search ............................ 326/37, 38, 41, 326/46, 47, 82

(56) References Cited

U.S. PATENT DOCUMENTS

| 6,724,328 B1 * | 4/2004 | Lui et al. ..................... 341/101 |
| 2003/0052709 A1 * | 3/2003 | Venkata et al. ................ 326/37 |

* cited by examiner

*Primary Examiner*—Anh Q. Tran
(74) *Attorney, Agent, or Firm*—Townsend and Townsend and Crew, LLP

(57) ABSTRACT

A system for recovering and aligning synchronous data transmissions is disclosed. The system includes a transmitter configured to transmit a source clock signal and a number of data groups over a number of channels with different latencies/propagation delays. The data groups are transmitted during the same clock cycle pursuant to the source clock signal. Each data group is transmitted over a corresponding media channel. The system also includes a receiver configured to receive the source clock signal and the data groups over the corresponding channels and to re-align or recover the wide word that comes in on the channels that are skewed. The receiver further includes: for each channel, (a) a local clock configured to generate a local clock signal based on the source clock signal, the local clock signal being phase-shifted from the source clock signal by a predetermined amount of phase shift, (b) a logic device configured to clock in the data group received over the channel using the local clock signal, (c) a sequence number generator configured to generate a sequence number associated with the data group, (d) a FIFO configured to store and output the clocked-in data group and the associated sequence number, (e) a memory device configured to store the clocked-in data group from the FIFO using the associated sequence number as a memory address, the memory device further configured to output a predetermined portion of its contents after a predetermined capacity threshold is reached. The transmitter is further configured to transmit a start-of-cell signal to the receiver. The sequence number generators are synchronized upon receiving an alignment cell, which is identified by a start-of-cell signal having a specific value for a predetermined cycle period. In one implementation, the receiver is implemented using a number of field programmable gate arrays and the local clocks are implemented using digital clock managers associated with the field programmable gate arrays.

26 Claims, 2 Drawing Sheets

METHOD AND SYSTEM FOR RECOVERING AND ALIGNING SYNCHRONOUS DATA OF MULTIPLE PHASE-MISALIGNED GROUPS OF BITS INTO A SINGLE SYNCHRONOUS WIDE BUS

BACKGROUND OF THE INVENTION

The present invention generally relates to data communications and, more specifically, to a method and system for recovering and aligning data transmissions over a synchronous bus.

In electronic equipment, various internal components communicate and exchange information and data with each other. Such communications are usually conducted over a media, such as a backplane, traces, wires or cables. A transmitter or source of traffic, for example, a card transmitting data on a 32-bit wide synchronous bus and a SOC (start-of-cell) signal onto a media, transmits data toward a receiver which is located at the other end of the media. The electrical signals going across the media are generally routed in groups, where each group of signals/bits is length-matched. This means that the propagation latency of traversing the media is the same for all signals/bits within the same group; however, different groups may have different latencies even though the different groups are sent from the transmitter at the same time. Different groups may arrive at the receiver in different times due to delta in media length or different delays across the media. As a result, different groups may be phase-misaligned or skewed.

For example, assume that there are eight (8) groups of four (4) bits each, a source-synchronous clock signal ("CLK") and an additional SOC signal, all of which form a wide synchronous bus. All thirty-two (32) bits (plus the SOC signal) of the bus are fully synchronous and aligned as they exit the transmitter. However, due to the latency mentioned above, not all eight (8) groups (32 bits) may arrive at the receiver at the same time.

Data is only meaningful if the original thirty-two (32) bits can be identified and assembled. In other words, all eight (8) groups need to be de-skewed at the receiver in order to recover the original thirty-two (32) bits. To capture the original thirty-two (32) bits at the receiver, the CLK can be used. Using the CLK, however, would result in poor performance. That is because the CLK would have to run at low frequency to ensure setup/hold times are not violated in the presence of various delays of the different groups across the media.

Hence, it would be desirable to provide a method and system that is capable of resolving the foregoing problem, as well as others, by recovering and aligning data transmissions over a synchronous bus in an efficient manner.

BRIEF SUMMARY OF THE INVENTION

A system for recovering and aligning synchronous data transmissions is disclosed. In one embodiment, the system includes a transmitter configured to transmit a source clock signal and a number of data groups over a number of channels. The data groups are transmitted during the same clock cycle pursuant to the source clock signal. Each data group is transmitted over a corresponding channel.

The system also includes a receiver configured to receive the source clock signal and the data groups over the corresponding channels. The receiver further includes: for each channel, (a) a local clock configured to generate a local clock signal based on the source clock signal, the local clock signal being phase-shifted from the source clock signal by a predetermined amount of phase shift, (b) a logic device configured to clock in the data group received over the channel using the local clock signal, (c) a sequence number generator configured to generate a sequence number associated with the data group, (d) a FIFO configured to store and output the clocked-in data group and the associated sequence number, (e) a memory device configured to store the clocked-in data group from the FIFO using the associated sequence number as a memory address, the memory device further configured to output a predetermined portion of its contents after a predetermined capacity threshold or level is reached.

In one embodiment, the transmitter is further configured to transmit a start-of-cell signal to the receiver. Upon the receiver detecting the start-of-cell signal having a specific value for a predetermined cycle period, the sequence number generators are synchronized.

In one implementation, the receiver is implemented using a number of field programmable gate arrays and the local clocks are implemented using digital clock managers associated with the field programmable gate arrays.

Reference to the remaining portions of the specification, including the drawings and claims, will realize other features and advantages of the present invention. Further features and advantages of the present invention, as well as the structure and operation of various embodiments of the present invention, are described in detail below with respect to accompanying drawings, like reference numbers indicate identical or functionally similar elements.

DETAILED DESCRIPTION OF THE INVENTION

The present invention in the form of one or more exemplary embodiments will now be described. In an exemplary aspect, a method is disclosed for de-skewing groups of bits received at a receiver to recover the full-width bus in a common clock domain using a source-generated roll-over counter and a dual-port random access memory at the receiver.

Figure 1:
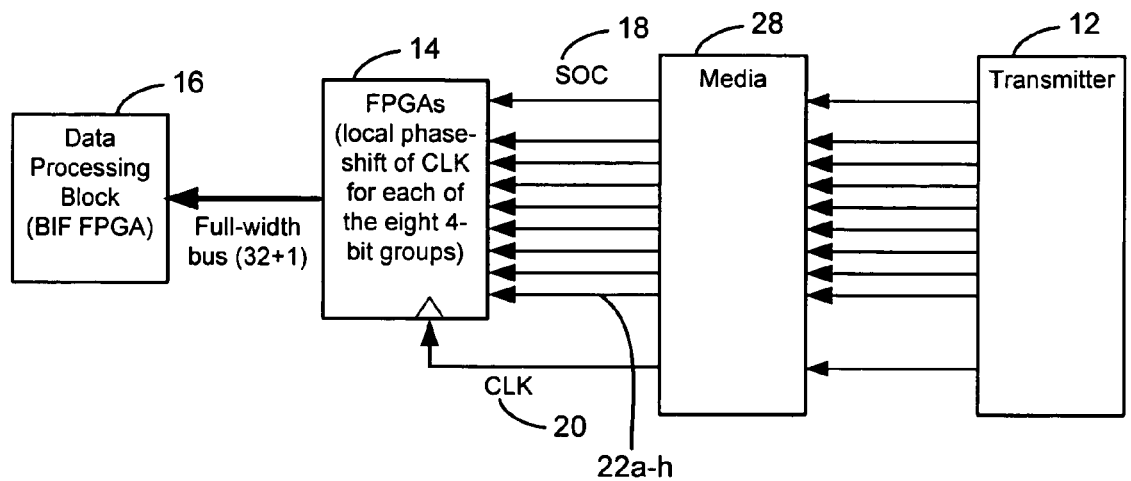
FIG. 1 is a simplified schematic block diagram illustrating an exemplary embodiment of the present invention.

FIG. 1 is a simplified schematic block diagram illustrating an exemplary embodiment of the present invention. In this embodiment, the system 10 includes a transmitter 12, a media 28, a data recovery/alignment ("DR/A") module 14 and a data processing block 16. The transmitter 12 can be any type of device that is capable of transmitting traffic including, for example, a signal card. The transmitter 12 transmits a number of signals over the 28 media having a number of channels to the DR/A module 14. The signals include a SOC signal 18, data groups 22a–h, and a clock (CLK) signal 20.

In this embodiment, each data group 22 is made up of four (4) bits. The data groups 22a–h respectively represent eight (8) groups and collectively make up a 32-bit word. It should be noted that each of the data groups 22a–h may have a different delay or latency going from the transmitter 12 to the DR/A module 14 through the media 28. However, within each data group 22, all four (4) bits have the same delay, i.e., all four (4) bits are length-matched and arrive at the DR/A module 14 at the same time.

The SOC signal 18 is used to indicate the start of a cell. The CLK signal 20 is used by the transmitter 12 to control transmission of the data groups 22a–h for each cycle. In this embodiment, a 32-bit word is transmitted by the transmitter 12 every cycle based on the CLK signal 20. A cell contains a fixed amount of data. If a cell contains fifty-two (52) bytes, then the SOC signal 18 is sent every thirteen (13) cycles (four (4) bytes (32 bits) are sent every cycle).

In an exemplary aspect, the DR/A module 14 performs two functions to recover the data groups 22a–h transmitted from the transmitter 12, more specifically, a data recovery function and a word alignment function, as will be further described below. The DR/A module 14 includes a number of DR/A sub-modules 14a. In one implementation, the DR/A module 14 includes a number of logic devices, such as, field programmable gate arrays (FPGAs).

Figure 2:
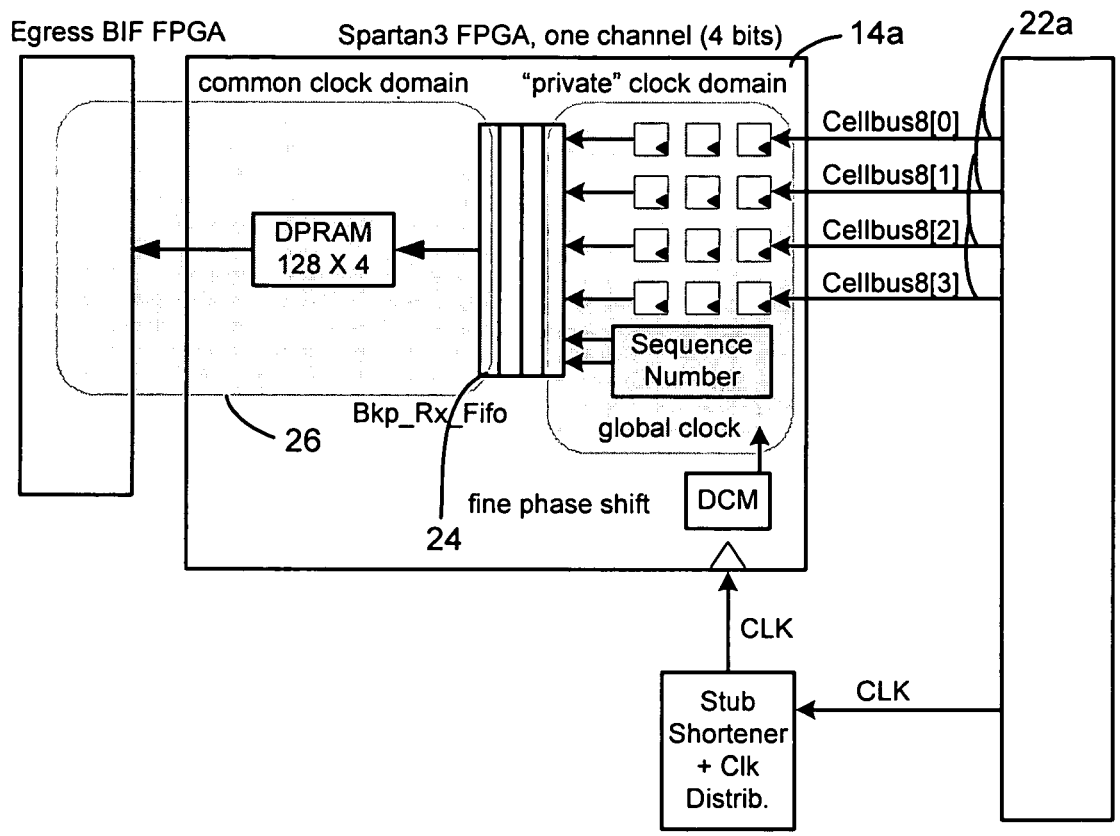
FIG. 2 is a simplified schematic block diagram further illustrating one embodiment of the present invention.

FIG. 2 is a simplified schematic block diagram further illustrating one embodiment of the DR/A sub-module 14a operating on one of the data groups 22a–h, for example, data group 22a. As noted above, data group 22a is made up of four (4) bits. It should be noted that other DR/A sub-modules 14a operate on the other data groups 22b–h in a similar manner.

To carry out the data recovery function, a private source-synchronous or phase-shifted clock is created locally for data group 22a. It should be noted that all eight (8) data groups 22a–h arriving from the media 28 are only frequency-locked to the CLK signal 20 but not phase-aligned. Therefore, in order to clock in the data groups 22a–h, a phase-shifted version of the CLK signal 20 is created for each data group 22. A phase-shifted version of the CLK signal 20 is also created for the SOC signal 18. In this embodiment, there are then nine (9) "phase domains" or "phase-shifted" clocks. The foregoing allows each data group 22 to have the best timing margin, thus, allowing the CLK signal 20 to have high frequency which, in turn, increases the bandwidth of the transmission across the media 28.

In one implementation, the private phase shift per data group 22 is done using the digital clock managers (DCMs) in the FPGAs. An example of such FPGAs is the Spartan3 FPGA manufactured by Xilinx. A DCM can do fine phase shift of the CLK signal 20 in granularity of, for example, 50 ps, such that all four (4) bits of each data group 22 are clocked in the center of the eye opening.

The amount of phase shift to be applied to the CLK signal 20 to create the phase-shifted clock for each data group 22 varies depending on the latency delay of each data group 22 with respect to the CLK signal 20. The latency delay of each data group 22 and the CLK signal 20 can be determined empirically based on measurements or calculated based on known parameters. When the latency delay of a data group 22 is known with respect to that of the CLK signal 20, the private phase shift for that corresponding data group 22 can be determined so that such data group 22 can be clocked correctly using its associated phase-shifted clock.

As mentioned above, the DR/A sub-module 14a also performs a word alignment function, described as follows. Data for each data group 22 and their associated sequence numbers are stored into an associated FIFO (First-In-First-Out) memory 24 that is clocked in using its associated phase-shifted clock. As will be further described below, the function of FIFO memory 24 is to cross clock domains from the local/private phase-shifted clock to the common clock domain. In this illustration, four (4) bits are stored into the FIFO memory 24 every clock cycle under the control of the associated phase-shifted clock. In addition, a corresponding sequence number is concatenated with the four (4) bits and stored into the memory 24. Sequence numbers, as will be further explained below, are tags respectively applied per phase-shifted clock cycles to the data of the eight (8) data groups 22a–h that were originally sent together by the transmitter 12 per clock cycle based on the CLK signal 20 so as to allow them to be later identified as having been transmitted during the same clock cycle. The sequence number for each 4-bit group is incremented every clock cycle. The current sequence number is maintained by a sequence number counter. In essence, data from each data group 22 is written into its associated FIFO memory 24 with sequence numbers.

Sequence numbers are used to respectively identify data cycles from all eight (8) data groups 22a–h that were originally sent together by the transmitter 12. All corresponding initial sequence numbers for data from the data groups 22a–h are initialized to a specific initial value. This initial value is provided by the transmitter 12 and forwarded to the DR/A module 14 via an alignment cell. From that moment on, the transmitter 12 and the DR/A module 14 independently increment a sequence number counter starting with this initial value. Each clock/data cycle is associated with and identified by a unique sequence number. The alignment cell is a cell (e.g., nine (9) cycles long) that is signified by a special SOC signal 18 having a value of "1" for four (4) consecutive clock cycles (or some other pre-defined cycle-count). In one embodiment, the alignment cell includes seven (7) cycles of pre-defined data pattern and two (2) cycles of data representing the initial value.

When the special SOC signal 18 is detected by the DR/A module 14, the relevant FPGAs associated with the data groups 22a–h are informed about this event. Since the SOC signal 18 is not in phase with the data groups 22a–h, the SOC signal 18 is treated as asynchronous. When the relevant FPGAs associated with the data groups 22a–h receive this indication, they look for the predefined data pattern embedded in the alignment cell and lock to it. The sequence number value embedded in the alignment cell is then retrieved and the sequence number counters associated with the corresponding data groups 22a–h are then set to this value thereby synchronizing the sequence numbers in all DR/A sub-modules 14a of all the data groups 22a–h. It should be noted that alignment cells having specific values can be sent periodically by the transmitter 12 to align any newly plugged in card(s), assuming the media 28 is shared between multiple receiver cards, and correct any possible misalignment caused by conditions, such as, electro-static discharge. For example, since the transmitter 12 independently maintains a sequence number counter, the correct sequence number can be forwarded to the DR/A module 14 to provide the appropriate alignment.

For each FIFO memory 24 associated with a corresponding data group 22, memory contents are read out and written into a corresponding dual port random access memory (DPRAM) 26. More specifically, each 4-bit group is written into the DPRAM 26 using its associated sequence number as the "write" address. In other words, memory contents of the FIFO memories 24 associated with the data groups 22a–h are transferred over to a number of DPRAMs 26. It should be noted that the "read" operations performed on the FIFO memories 24 are controlled by a common clock domain which is common to all the FPGAs used to recover the data groups 22a–h. Reading the FIFO memory 24 is done in small bursts based on the "FIFO Half Full" indication to avoid FIFO underrun or overflow. By using sequence numbers as "write" addresses in the DPRAMs 26, data cycles of data groups 22*a–h* having the same sequence number are stored at the same locations in the DPRAMs 26. Data belonging to data groups 22*a–h* and having the same sequence number means they were originally sent out together by the transmitter 12 during the same clock cycle and, hence, should be treated together. Since the DPRAM 26 can be read or written to at the same time, special care is taken to ensure that no 'read' and 'write' operations are performed with the same address concurrently.

Once the DPRAM 26 is filled up to a predefined capacity threshold, data can be read out beginning with a specific starting address. It should be noted that there is a DPRAM 26 for each data group 22. Once one of the DPRAMs 26 has reached the predefined capacity threshold, 'read' operations are initiated for all DPRAMs 26 in a coordinated fashion, such that all DPRAMs 26 start sending a burst of data out on the same common clock cycle starting from the same DPRAM address. This is because all the DPRAMs 26 collectively make up the data groups 22*a–h*. In one embodiment, once the predefined capacity threshold is reached, the FPGA that handles the SOC and CLK signals 18 and 20 initiates a burst of reads from the DPRAMs 26. Data from the reads is forwarded to the data processing block 16. Once a predefined low watermark threshold is reached, the 'read' operations are discontinued. The predefined low watermark threshold can be, for example, a predetermined number of blocks that are to be read out from the DPRAM 26.

It should be noted that the DPRAMs 26 may be filled up at the same rate but at different phases (i.e., skewed), because the corresponding FIFO memory 24 providing the data to the DPRAM 26 is driven by the phase-shifted clock associated with a particular data group 22 and due to the different latency across the media 28. Due to such phase difference, an appropriate margin is built into the predefined capacity threshold to allow all the DPRAMs 26 to collect sufficient data for the subsequent 'read' operations. The appropriate margin can be determined based on the maximum latency variation of the data groups 22*a–h* traveling from the transmitter 12 to DR/A module 14.

Also, it should be noted that the common clock for reading the DPRAMs 26 is faster than the local/private phase-shifted clocks used for writing data to the FIFO memories 24.

In an exemplary implementation, the present invention is implemented using a combination of hardware and software in the form of control logic, in either an integrated or a modular manner. Based on the disclosure and teachings provided herein, a person of ordinary skill in the art will know of other ways and/or methods to implement the present invention.

It is understood that the examples and embodiments described herein are for illustrative purposes only and that various modifications or changes in light thereof will be suggested to persons skilled in the art and are to be included within the spirit and purview of this application and scope of the appended claims. All publications, patents, and patent applications cited herein are hereby incorporated by reference for all purposes in their entirety.

What is claimed is:

1. A system for recovering and aligning synchronous data transmissions, comprising:

a transmitter configured to transmit a source clock signal and a plurality of data groups over a plurality of channels, the plurality of data groups being transmitted during the same clock cycle pursuant to the source clock signal, each data group being transmitted over a corresponding channel; and a receiver configured to receive the source clock signal and the plurality of data groups over the plurality of channels, the receiver further configured to include:

for each channel: (a) a local clock configured to generate a local clock signal based on the source clock signal, the local clock signal being phase-shifted from the source clock signal by a predetermined amount of phase shift, (b) a logic device configured to clock in the data group received over the channel using the local clock signal, (c) a sequence number generator configured to generate a sequence number associated with the data group, (d) a FIFO buffer configured to store and output the clocked-in data group and the associated sequence number, (e) a memory device configured to store the clocked-in data group from the FIFO buffer using the associated sequence number as a memory address, the memory device further configured to output a predetermined portion of its contents after a predetermined capacity threshold is reached.

2. The system of claim 1 wherein the transmitter is further configured to transmit a start-of-cell signal to the receiver; and wherein upon the receiver detecting the start-of-cell signal having a specific value for a predetermined cycle period, the sequence number generators are synchronized.

3. The system of claim 1 wherein the receiver is implemented using a plurality of field programmable gate arrays.

4. The system of claim 3 wherein the local clock is implemented using a digital clock manager associated with a field programmable gate array.

5. The system of claim 1 wherein the predetermined amount of phase shift is determined empirically.

6. The system of claim 1 wherein the predetermined amount of phase shift is calculated based on respective latency delays of the source clock signal and a corresponding channel.

7. The system of claim 1 wherein each data group includes a plurality of data signals; and wherein the plurality of data signals within each data group have the same latency delay over the corresponding channel.

8. The system of claim 1 wherein the memory device is a dual port random access memory.

9. The system of claim 1 wherein the sequence number generator is incremented every clock cycle pursuant to the local clock signal.

10. A backplane incorporating the system as recited in claim 1.

11. A system for recovering and aligning synchronous data transmissions, comprising:

a transmitter configured to transmit a source clock signal and a plurality of data groups of over a plurality of channels, wherein a set of data groups collectively forming a data word is transmitted during each clock cycle pursuant to the source clock signal, each data group in the set of data groups being transmitted over a corresponding channel; and a receiver configured to receive the source clock signal and sets of data groups over corresponding channels, the receiver including:

a plurality of local clocks, each local clock configured to generate a local clock signal based on the source clock signal, the local clock signal being phase-shifted from the source clock signal by a predetermined amount of phase shift;

a plurality of devices, each device configured to receive and clock in corresponding data groups from a corresponding channel using the local clock signal from a corresponding local clock;

a plurality of sequence number counters, each sequence number counter associated with a corresponding device and configured to provide respective sequence numbers for data groups received by the corresponding device;

a plurality of buffers, each buffer configured to store and output clocked-in data groups from a corresponding device and their associated sequence numbers; and a plurality of memory devices, each memory device configured to store the clocked-in data groups from a corresponding buffer using their associated sequence numbers as memory addresses, each memory device further configured to output a predetermined portion of its contents after a predetermined capacity threshold is reached.

12. The system of claim 11 wherein the transmitter is further configured to transmit a start-of-cell signal to the receiver; and wherein upon the receiver detecting the start-of-cell signal having a specific value for a predetermined cycle period, the sequence number counters are synchronized.

13. The system of claim 11 wherein the receiver is implemented using a plurality of field programmable gate arrays.

14. The system of claim 13 wherein the local clocks are implemented using two or more digital clock managers associated with plurality of field programmable gate arrays.

15. The system of claim 11 wherein the predetermined amount of phase shift associated with each local clock is determined empirically.

16. The system of claim 11 wherein the predetermined amount of phase shift associated with each local clock is calculated based on respective latency delays of the source clock signal and a corresponding channel.

17. The system of claim 11 wherein each data group includes a plurality of data signals; and wherein the plurality of data signals within each group have the same latency delay over the corresponding channel.

18. The system of claim 11 wherein the plurality of memory devices include a dual port random access memory.

19. The system of claim 11 wherein each sequence number generator is incremented every clock cycle pursuant to the local clock signal associated with a corresponding local clock.

20. A backplane incorporating the system as recited in claim 11.

21. A method for recovering and aligning synchronous data transmissions, comprising:

transmitting a source clock signal and a plurality of data groups from a transmitter to a receiver per clock cycle pursuant to the source clock signal, the plurality of data groups collectively forming a data word;

at the receiver:

using the source clock signal to create a plurality of local clock signals, each local clock signal being phase-shifted from the source clock signal by a corresponding predetermined amount of phase shift;

clocking in each data group using a corresponding local clock signal;

assigning a sequence number to each clocked-in data group;

storing each clocked-in data group and its assigned sequence number in a corresponding buffer;

reading out each clocked-in data group and its assigned sequence number from its corresponding buffer; and storing each read-out data group into a corresponding dual port memory using the assigned sequence as its memory address.

22. The method of claim 21 further comprising:

sending a special start-of-cell signal and an alignment cell from the transmitter to the receiver;

at the receiver, upon detecting the special start-of-cell signal, initializing sequence numbers to be assigned to clocked-in data groups to a starting value, the starting value being embedded in the alignment cell.

23. The method of claim 21 further comprising:

at the receiver, incrementing the sequence number for future assignment to a next clocked-in data group.

24. The method of claim 21 further comprising:

at the receiver, reading out a predetermined portion of each dual port memory.

25. The method of claim 21 wherein the corresponding predetermined amount of phase shift for each local clock signal depends on the respective latency delays of the source clock signal and a corresponding data group.

26. A backplane utilizing the method as recited in claim 21.

* * * * *